T. G. CLIFFORD.
Wagon-Brake.
No 64,631. Patented May 14, 1867
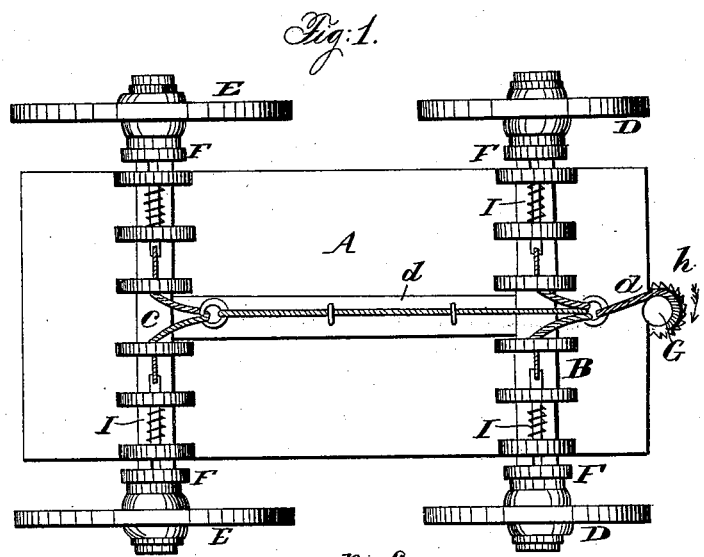
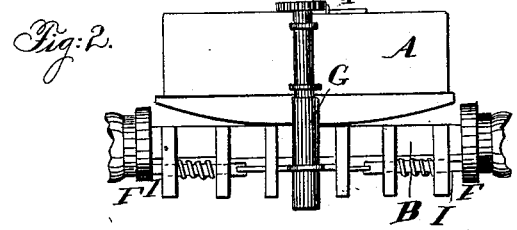
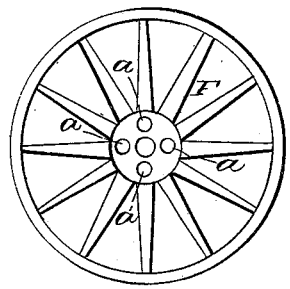
Witnesses.
Inventor.
Thomas G. Clifford

United States Patent Office.

THOMAS G. CLIFFORD, OF DERBY, CONNECTICUT.

Letters Patent No. 64,631, dated May 14, 1867.

IMPROVEMENT IN WAGON-WHEEL LOCK.

*The Schedule referred to in these Letters Patent and making part of the same.*

TO ALL WHOM IT MAY CONCERN:

Be it known that I, THOMAS G. CLIFFORD, of Derby, in the county of New Haven, and State of Connecticut, have invented a new Improvement in Wagon-Wheel Lock; and I do hereby declare the following, when taken in connection with the accompanying drawings and the letters of reference marked thereon, to be a full, clear, and exact description of the same, and which said drawings constitute part of this specification, and represent, in—

Figure 1, a view of the under side of a wagon, looking up.
Figure 2, a front end view; and in
Figure 3, an inside view of one of the wheels.

The object of this invention is to lock two or more of the wheels of a wagon for the purpose of a brake, and consists in the arrangement of a bolt to each wheel, combined with a plate upon the wheel, and with a mechanism for operating the said bolts, so that at pleasure the said bolts may be thrown in the recesses upon the wheel, and firmly lock and prevent the revolutions of the same.

In order to the clear understanding of my invention, as well as to enable others to construct the same, I will proceed to a description thereof, as illustrated in the accompanying drawings.

A is the body of a wagon; B the forward axle; C the rear axle; D the forward wheels; E the hind wheels, constructed and attached together in the usual manner, save that upon the inside of the hub of the wheels is fixed a metallic plate, F, seen in fig. 3, provided with one or more holes, $a$, and upon the axles I place bolts, L, in such relative position to the wheels that when moved outward they will enter one of the holes in the said plate F, and are forced outward to so enter by springs on the said bolts, as seen in figs. 1 and 2, and when so thrown out and entered into their respective holes in the wheel, the revolution of the wheel is entirely prevented. To withdraw the bolts and permit the revolution of the wheels, I arrange centrally upon the body, in some convenient position, a shaft, G, to which is attached a rope, $d$, chain, or similar device, extending back and connected to each of the bolts, as seen in fig. 1, so that by turning the said shaft as denoted by the arrow in fig. 1, the several bolts will be withdrawn from the wheel and leave them perfectly free, and the shaft G, when so turned, is held in the position with the bolts withdrawn by a pawl and ratchet, $f$ and $h$. Then, when at any time it is desired to arrest the revolution of the wheels, release the ratchet from the pawl, and the springs upon the bolts will quickly drive them out into the plate upon the hub, and arrest the revolution of the wheels. This arrangement may be applied to one, two, or all of the wheels of a vehicle, and is alike applicable to vehicles of two wheels.

Having thus fully described my invention, what I claim as new and useful, and desire to secure by Letters Patent, is—

The arrangement of the bolts I, in combination with the plates F and the shaft G, with its ratchet $h$, constructed and arranged to operate substantially in the manner herein set forth.

THOMAS G. CLIFFORD.

Witnesses:
A. J. TIBBITS,
J. H. SHUMWAY.